United States Patent [19]

Berenter

[11] Patent Number: 5,466,015

[45] Date of Patent: Nov. 14, 1995

[54] APPARATUS AND METHOD FOR MOUNTING ITEMS AT AN INACCESSIBLE WALL SURFACES

[76] Inventor: Allen Berenter, 11380 Prosperity Farms Rd. Suite 110-B, Palm Beach Gardens, Fla. 33410

[21] Appl. No.: 232,062

[22] PCT Filed: Nov. 13, 1992

[86] PCT No.: PCT/US92/09613

§ 371 Date: Apr. 26, 1994

§ 102(e) Date: Apr. 26, 1994

[87] PCT Pub. No.: WO93/10316

PCT Pub. Date: May 27, 1993

[51] Int. Cl.⁶ ........................................... F16L 3/04
[52] U.S. Cl. .............. 285/158; 285/12; 285/208
[58] Field of Search .................... 285/200, 206, 285/207, 208, 209, 210, 158, 12

[56] References Cited

U.S. PATENT DOCUMENTS

| | | | |
|---|---|---|---|
| 522,005 | 6/1894 | Burke | 285/210 |
| 608,174 | 8/1898 | Byrnes | 285/210 |
| 945,517 | 1/1910 | Goodwin | 285/210 |
| 1,169,691 | 1/1916 | Elmo | 285/210 X |
| 1,182,710 | 5/1916 | Rowell | 285/210 |
| 2,059,153 | 10/1936 | Snyder . | |
| 2,421,015 | 5/1947 | Davidson | 285/206 X |
| 2,537,183 | 1/1951 | Bloomer | 285/210 |
| 2,667,037 | 1/1954 | Thomas et al. . | |
| 2,863,314 | 12/1958 | Van Voorden . | |
| 2,936,787 | 5/1960 | Mercier | 285/208 X |
| 3,722,165 | 3/1973 | Forsberg et al. . | |
| 3,749,424 | 7/1973 | Greene | 285/200 X |
| 4,631,889 | 12/1986 | Adam et al. . | |
| 4,748,821 | 6/1988 | Berenter . | |
| 4,848,821 | 7/1989 | Llewellyn . | |
| 4,998,938 | 3/1991 | Ghajar et al. | 285/206 X |

FOREIGN PATENT DOCUMENTS

| | | |
|---|---|---|
| 0399165 | 11/1990 | European Pat. Off. . |
| 2382558 | 11/1978 | France . |
| 67613 | 5/1892 | Germany . |
| 2452398 | 5/1976 | Germany . |
| 3115023 | 11/1982 | Germany . |
| 3343085 | 2/1985 | Germany . |
| 2216917 | 10/1989 | United Kingdom . |
| 2223550 | 4/1990 | United Kingdom ............ 285/206 |

*Primary Examiner*—Dave W. Arola

[57] ABSTRACT

A through-wall sleeve assembly includes an elongate sleeve having an axial passage, open ends and a radially constrictible frustoconical flange at one of the ends. The sleeve is inserted through a bore in a wall, with the flange at the leading end of the sleeve so that the flange is constricted by the wall or by an outer tube inserted in the bore. The flange returns to an expanded, relaxed condition when it projects beyond a remote surface of the wall and forms a seal with the remote surface when the sleeve is drawn back. An item such as a nozzle, hook or eye having external threads is inserted in the axial passage and fixed relative to the sleeve.

21 Claims, 4 Drawing Sheets

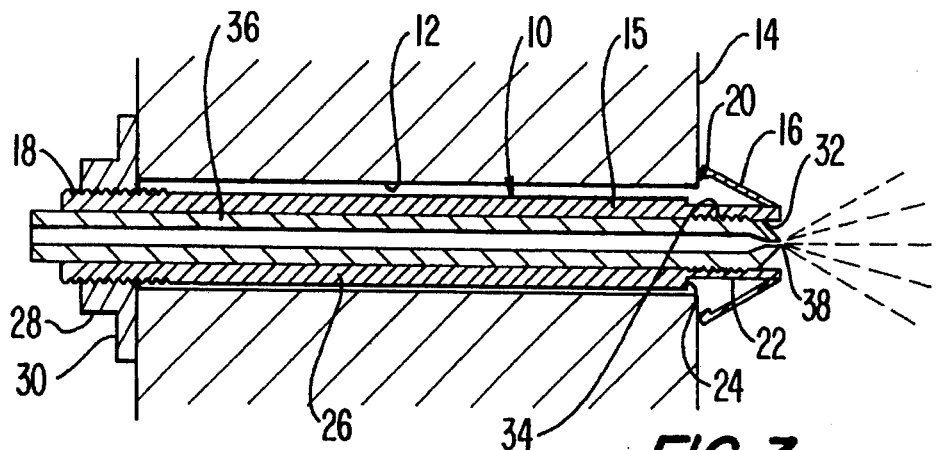
FIG. 1
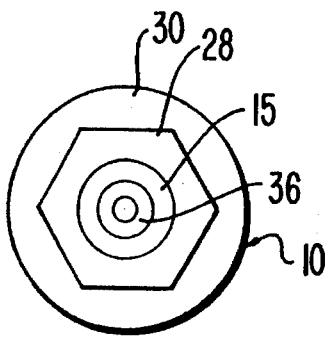
FIG. 2
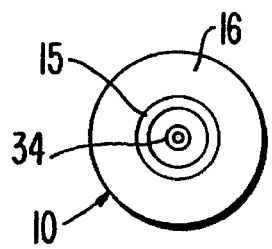
FIG. 3
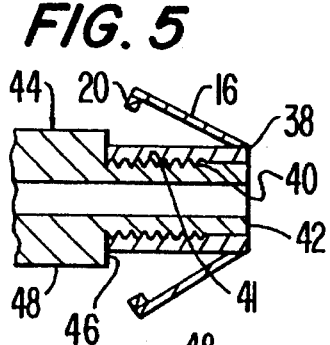
FIG. 5
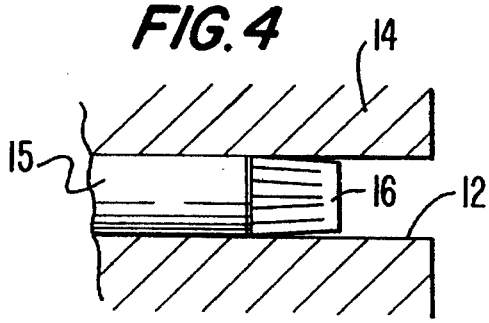
FIG. 4
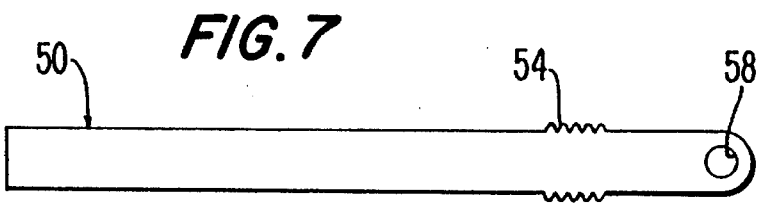
FIG. 6
FIG. 7

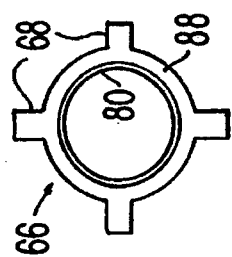
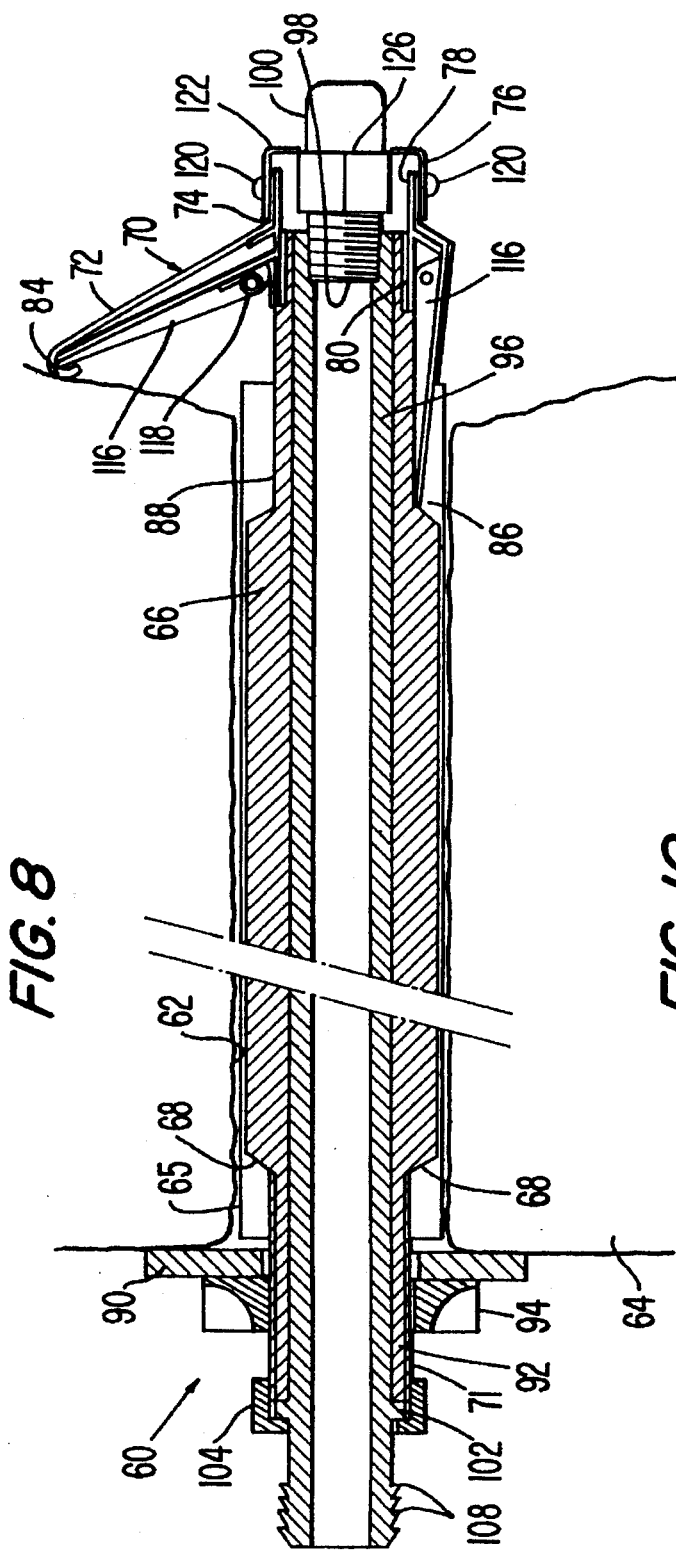
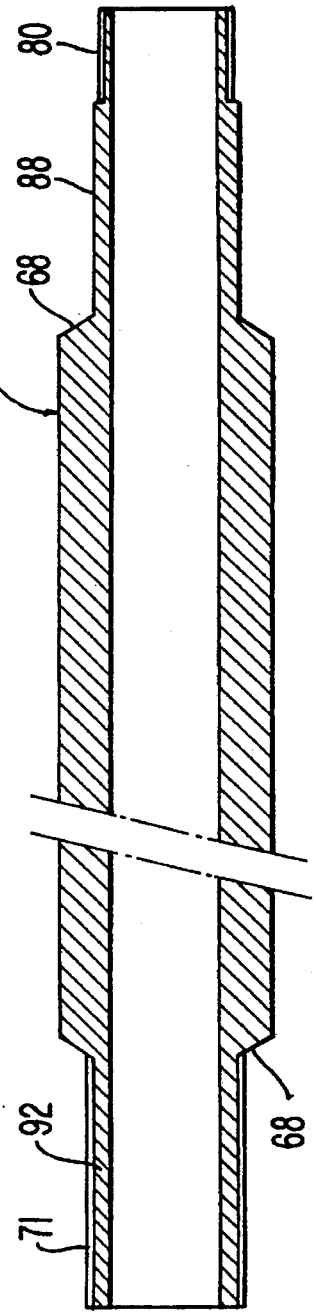

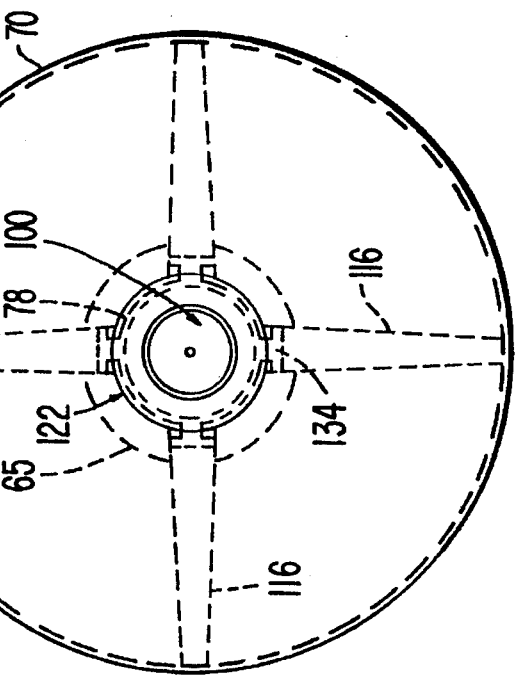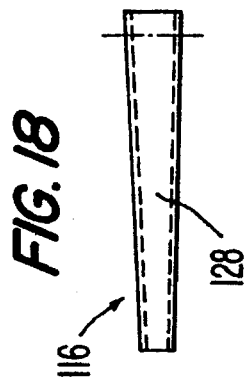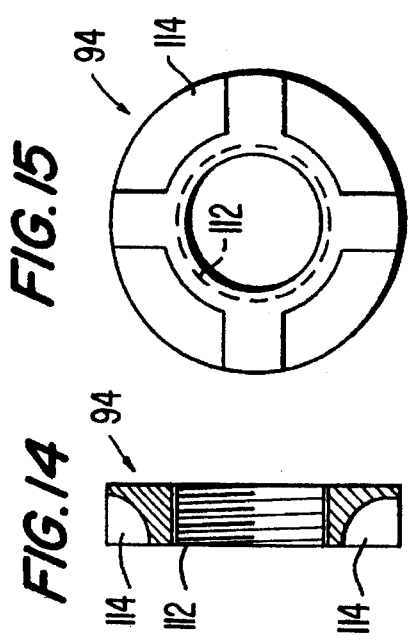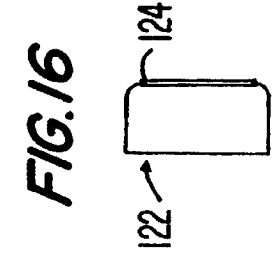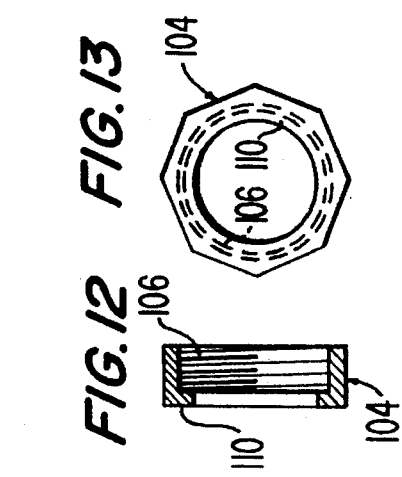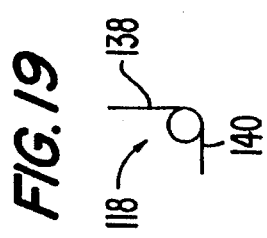

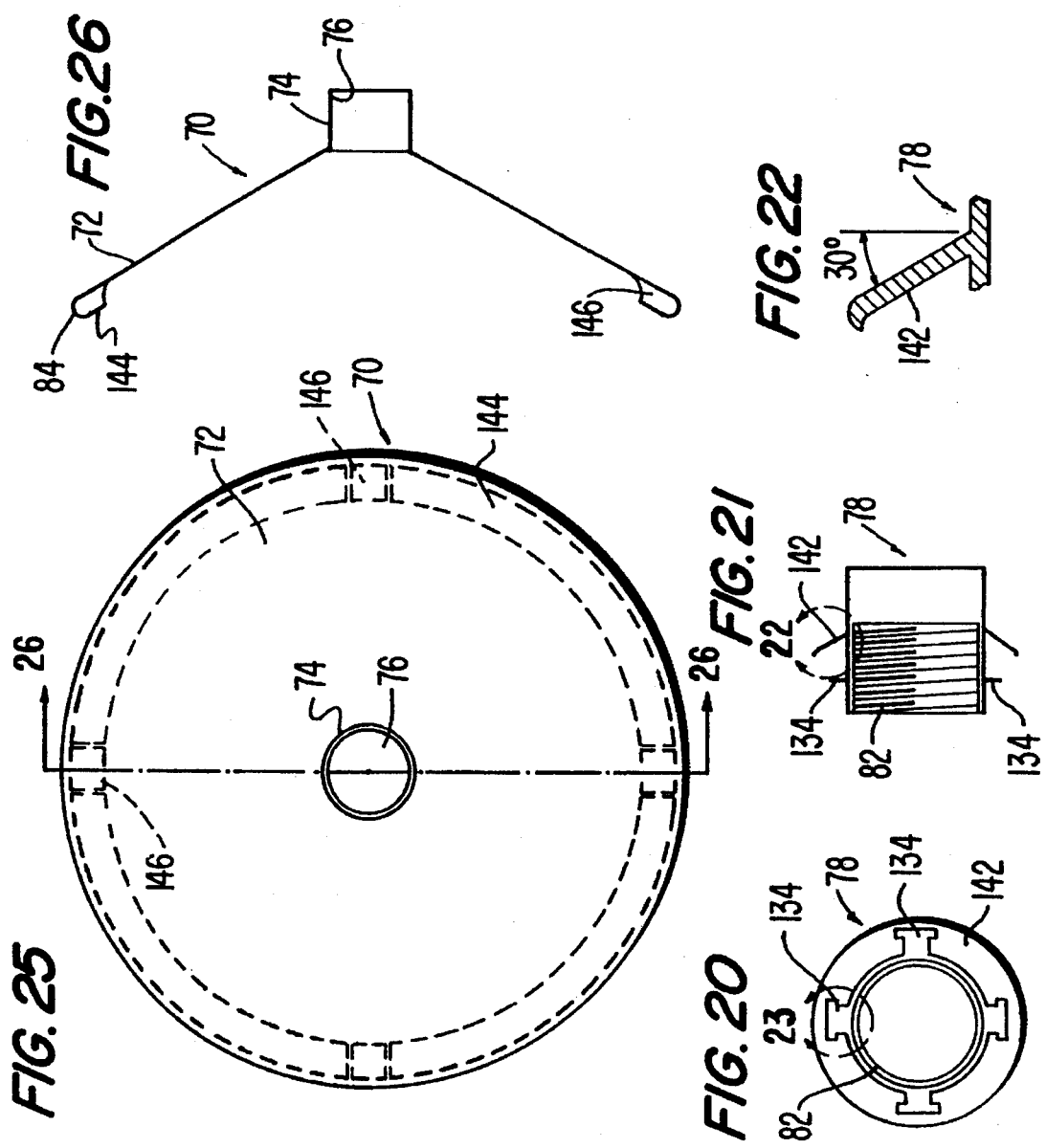

5,466,015

APPARATUS AND METHOD FOR MOUNTING ITEMS AT AN INACCESSIBLE WALL SURFACES

BACKGROUND OF THE INVENTION

The present invention relates to apparatus for mounting devices on wall surfaces which are difficult to access.

There is often the need to secure various objects to exterior surfaces of buildings which are high above the ground or are otherwise not readily accessible. Downspouts, wires and signs are just a few examples. The mounting of such items on the exterior of the building normally entails the use of ladders, scaffolding, or other more elaborate support systems depending on the height and type of building involved, The use of such devices is expensive, time-consuming and dangerous.

SUMMARY OF THE INVENTION

The present invention allows the installation and securing of an item on a wall entirely from one side of the wall. This is advantageous in the situation where one side of the wall is not very accessible, e.g. when it is the outside wall of a building many stories above ground level. It also allows installation by just one person.

The invention comprises a through-wall sleeve assembly including a hollow cylindrical sleeve of, for example, metal or hard plastic material, which can be of various lengths depending on the thickness of the wall involved.

Attached to the one end of the sleeve is an umbrella-like flange of a resilient flexible membrane which can be radially constricted and folded upon itself in order to assume a collapsed position around the outer circumference of the sleeve. The flange in this folded position fits within an annular space lying within a larger outer circumference defined, at least generally, by another portion of the sleeve. This allows for ease in inserting the sleeve in a pre-drilled bore in a wall. Upon being pushed through the wall and when extending out of the wall, the resiliency of the flange material causes the flange to open up to a circumference which is greater than the outer circumference of the sleeve. In order to aid the resiliency of the flange in biasing the flange into an open position, a biasing mechanism similar to that used in a toggle bolt can be employed. A spring in the biasing mechanism biases the membrane outward and thereby assists the inherent resilient bias of the membrane of the flange in moving the flange to an open position.

Attached to the underside of the flange, in one embodiment of the present invention, is an elastomeric material which seals the open flange against the exterior surface of the wall in order to prevent the ingress of moisture, dirt and other elements into the bore in the wall. This material is attached to an inner surface of the flange by, for example, an adhesive. In another embodiment, the material at the larger end of the flange can be thickened to help provide a seal between the flange and the exterior surface of the wall. A nut with a washer is screwed onto a threaded trailing end of the sleeve to secure the sleeve in the bore and to draw the flange back against the wall to form a hermetic seal against the exterior of the wall. The biasing mechanism helps keep the flange from collapsing or inverting when the flange is drawn back.

An item especially well suited to be mounted at the exterior of the wall by using the sleeve according to the present invention is a nozzle. Such nozzles can be employed in connection with the present inventor's system for disposing of condensate from air conditioners, as disclosed in U.S. Pat. No. 4,848,821.

BRIEF DESCRIPTION OF THE DRAWINGS

FIG. 1 is a cross-section of a first embodiment of the through-wall sleeve assembly according to the present invention in position in an opening through a wall, including a nozzle mounted in a sleeve;

FIG. 2 is a left-end view of the sleeve assembly of FIG. 1;

FIG. 3 is a right-end view of the sleeve assembly of FIG. 1;

FIG. 4 is a fragmentary side view of the sleeve assembly of FIG. 1 with the flange in a constricted condition inside an opening through the wall;

FIG. 5 is a fragmentary cross-section of a second embodiment of the through-wall sleeve assembly according to the present invention;

FIG. 6 is a side view of a hook member for use with the through-wall sleeve assembly according to the present invention;

FIG. 7 is a side view of an eye member for use with the through-wall sleeve assembly according to the preset invention;

FIG. 8 is a cross-section of a third embodiment of the through-wall sleeve assembly according to the present invention in position in an opening through a wall, with a nozzle mounted in the sleeve assembly;

FIG. 9 is a right end view of the through-wall sleeve assembly of FIG. 8;

FIG. 10 is a cross-section of the sleeve in the through-wall sleeve assembly of FIG. 8;

FIG. 11 is a right end view of the sleeve of FIG. 10;

FIG. 12 is an enlarged cross-section of the nozzle tube nut of the through-wall sleeve of FIG. 8;

FIG. 13 is a left end view of the nozzle tube nut of FIG. 12;

FIG. 14 is an enlarged cross-section of the sleeve nut of FIG. 8;

FIG. 15 is a left end view of the sleeve nut of FIG. 14;

FIG. 16 is an enlarged cross-section of the cover of FIG. 8;

FIG. 17 is an enlarged cross-section of one of the toggle arms of the sleeve assembly of FIG. 8;

FIG. 18 is a top plan view of the toggle arm of FIG. 17;

FIG. 19 is an enlarged side view of the toggle arm coil spring of FIG. 8;

FIG. 20 is an enlarged left end view of the toggle support of the sleeve assembly of FIG. 8;

FIG. 21 is an enlarged cross-section of the toggle arm support of FIG. 8;

FIG. 22 is an enlarged cross-section of the flange protector on the toggle arm support of FIG. 21;

FIG. 23 is a fragmentary enlargement of one of the toggle arm support posts of FIG. 20;

FIG. 24 is a side view of the toggle arm support port of FIG. 23;

FIG. 25 is a right end view of the flange of the sleeve assembly of FIG. 8; and

FIG. 26 is a cross-section taken along the line 26—26 of the flange of FIG. 25.

DETAILED DESCRIPTION OF THE PREFERRED EMBODIMENTS OF THE INVENTION

As shown in FIG. 1, the through-wall sleeve assembly according to the present invention, which is designated generally by the reference numeral 10, is in position in a bore 12 through a wall 14. In FIG. 1, the sleeve assembly 10 is inserted from the left side of the wall 14, which ordinarily is readily accessible, to protrude through the right side of the wall, which is normally not readily accessible. For example, the left side of the wall 14 may be accessible from an upper floor of a building, while the right side of the wall is on the exterior of the building, high above any supporting surface.

The sleeve assembly 10 includes a sleeve 15 which has a resilient flange 16 at its leading end, determined by the direction of insertion of the sleeve 10 into the bore 14, and external screw threads 18 at its trailing end. The flange 16 is in the form of a frustoconical membrane of resilient material attached at its smallest diameter to the leading end of the sleeve 15 and flaring outwardly and rearwardly therefrom. An annular sealing member 20 of compressible resilient material is attached at the trailing end of the flange, along the inner periphery thereof, by adhesive or the like. A portion 22 of the sleeve 15 at the leading end has a reduced outer diameter, thereby defining a shoulder 24 with a full outer diameter portion 26 of the sleeve 15. The axial length of the reduced outer diameter portion 22 is at least as great as the length of the generatrix of the frustoconical flange 16, that is, the dimension extending along the flange from its circle of greatest diameter to its circle of least diameter. A nut 28 having a washer 30, which may be integral with the nut 28, is threaded onto the trailing end of the sleeve 15 to engage the interior surface of the wall 14.

The sleeve 15 has interior threads 32 adjacent to the leading end for mating with external threads 34 on a nozzle 36. The nozzle 36 has a generally cylindrical configuration in which the outer diameter of the cylinder closely approximates the inner diameter of the sleeve 15. The exterior threads 34 on the nozzle 36 are adjacent to a nozzle opening 38 and have a diameter small enough so that the nozzle 36 can be slid through the interior of the sleeve 10 until the external threads 34 of the nozzle 36 engage the interior threads 32 on the sleeve 15. Then, only a minimal amount of rotation of the nozzle 36 relative to the sleeve 15 is required to secure the nozzle in position. A trailing end of the nozzle 36 is connected by a connection of a known type to a fluid line for conveying a fluid to the nozzle. It is contemplated that the through-wall sleeve assembly 10 according to the present invention, when used in connection with a nozzle 36, is particularly useful for conveying condensate from an air conditioning system to the nozzle. In this way, the condensate can be sprayed outwardly from the exterior of a building in the manner generally disclosed in the inventor's U.S. Pat. No. 4,848,821.

In use, the bore 12 is cylindrical, formed through the wall 14 by a drill of appropriate size. The leading end of the sleeve 15 is inserted into the bore 12 so that the material of the wall 14 surrounding the bore constricts the resilient flexible membrane of the flange 16 against the reduced diameter portion 22 of the sleeve 15, thereby forming folds in the flange 16 similar to those of a folded umbrella, as can be seen from FIG. 4. When the unattached, trailing edge of the flange 16 passes out of the bore 12, beyond the exterior surface of the wall 14, the resiliency of the flange 16 forces the flange radially outward to assume its frustoconical shape. At this point, the exterior threads 18 of the trailing end of the sleeve 15 are exposed on the interior side of the wall 14. The nut 28 and washer 30 is screwed onto the threads 18 of the sleeve 15 until the washer 30 engages the interior surface of the wall 14. The nut 28 and washer 30 is rotated further to draw the sleeve 15 axially inward and to compress the annular sealing member 20 against the exterior surface of the wall, thereby forming a weather-tight seal. In this state, the frustoconical surface of the flange 16 is bowed slightly inward. The nozzle 36 is slid through the sleeve 15 until the external threads 34 of the nozzle 36 contact the internal threads 32 at the leading end of the sleeve 15, and the nozzle 36 is rotated until it is in firm threaded engagement with the sleeve. The fluid connection at the trailing end of the nozzle 36 at the interior side of the wall is made so that the nozzle is ready for use.

It is contemplated that the resilient flange 16 can be provided separate from the rest of the sleeve, as can be seen from the embodiment illustrated in FIG. 5. In this embodiment, the frustoconical membrane 16 is attached to a cylindrical member 38 having female threads 40 which mate with male threads 41 on a reduced diameter portion 42 at the leading end of a sleeve 44, the reduced diameter portion 42 defining a shoulder 46 with a full diameter portion 48 of the sleeve 44. The reduced diameter portion 42 has a diameter small enough that both the cylindrical member 38 and the membrane of the flange 16, when the flange is in a constricted position around the cylindrical portion, are within the outer circumference of the full diameter portion 26. Flanges of the type according to the embodiment illustrated in FIG. 5 can be sent to an installation site separate from the sleeves and can be attached at the time of sleeve installation.

The through-wall sleeve assembly 10 according to the present invention is not limited to use in connection with nozzles. Other elements can be inserted into the sleeve 15 to provide a convenient mechanism for mounting said elements on an exterior side of a wall to which access is difficult or impossible. Accordingly, FIGS. 6 and 7 show, respectively, a hook member 48 and an eye member 50, either of which can be inserted into the sleeve 15 according to the present invention and secured in position projecting beyond the exterior surface of the wall 14 and, in this case, beyond the leading end of the sleeve 15. External threads 52 and 54 on the hook member 48 and the eye member 50, respectively, have a diameter such that they can be slid through the sleeve 15 until they engage the internal threads 32 at the leading end of the sleeve 15, whereupon they can be rotated for final threaded engagement with the sleeve. The axial distances between the threads 52 and a hook 56 on the hook member 48 and between the threads 54 and an eye 58 on the eye member 50 are chosen so that the hook 56 and the eye 58 extend beyond the leading end of the sleeve 15, where objects of various descriptions can be attached thereto.

Attached to the underside of the flange is an elastomeric material 20 which seals the open flange against the exterior surface of the wall in order to prevent the ingress of moisture, dirt and other elements into the bore in the wall. This material is attached to an inner surface of the flange by, for example, an adhesive. A nut with a washer is screwed onto a threaded trailing end of the sleeve to secure the sleeve in the bore and to draw the flange, and the resilient sealing element thereon, back against the wall to form a hermetic seal against the exterior of the wall.

As shown in FIG. 8, a third embodiment of the through-wall sleeve assembly according to the present invention, which is designated generally by the reference numeral 60, is in position in a bore 62 through a wall 64, which can be, for example, a masonry wall. An outer tube 65 is sized so that its outer diameter is slightly smaller than the diameter of the bore 62. The insertion of the outer tube 65, which can be a thin plastic tube, into the bore 62 before other elements of the sleeve assembly 60 are inserted insures that the bore 62 is large enough to receive the sleeve assembly 60. The outer tube 65 has a smooth internal surface and protects other elements of the sleeve assembly 60 from abrasion due to sliding contact with the material defining the bore 62, which can be masonry. The sleeve assembly 60 includes a sleeve 66 which has a plurality of radially-extending fins or ribs 68 which generally define an outer diameter just slightly smaller than the inner diameter of the outer tube 65.

The sleeve 66 has a resilient flange 70 at its leading end, determined by the direction of the insertion of the sleeve 66 into the bore 62, and external screw threads 71 at a trailing end. The flange 70 is a thin membrane of resilient material, such as neoprene, having an expanded position in which it defines a frustoconical portion 72. At the smaller end of the frustoconical portion 72, the flange 70 includes a cylindrical portion 74 defining an axial opening 76 (FIGS. 25 and 26). The flange 70 is attached to a support member 78 by stretching the cylindrical portion 74 so that it can fit over the support member 78, which is basically cylindrical. Due to the elastic nature of the material of the flange 70, the cylindrical portion 74 is held tightly on the support member 78. The support member 78 is secured to the leading end of the sleeve 66 by threads 80 on the sleeve and threads 82 (FIG. 21) on the support member 78.

The flange 70 flares outwardly and rearwardly from the cylindrical portion 74 to a trailing edge 84 which defines the largest diameter of the flange 70. The membrane which defines the flange 70 is preferably thickened at the trailing edge 84 to enhance the sealing of the trailing edge against the outer surface of the wall 64. The sleeve 66 projects, at the ends of the sleeve, axially beyond the fins 68. Thus, an annular space 86 is defined within the diameter generally defined with the radially outer surfaces of the fins 68. This space 86 accommodates the frustoconical portion 72 of the flange 70 when it is in a collapsed position against a projecting portion 88 of the sleeve 66. The axial length of the axially projecting portion 88 of the sleeve 66 at its leading end is at least as great as the combined length of the generatrix of the frustoconical portion 72 of the flange 70 and the length of the cylindrical portion 74.

A washer 90 is placed over an axially projecting portion 92 of the sleeve 66 at its trailing end, so that the washer engages the interior surface of the wall 64. A nut 94 threadedly engages screw threads 71 on the exterior surface of the rearward axially projecting portion 92 of the sleeve 66, whereby tightening the nut 84 pushes the washer 90 against the interior surface of the wall and draws the sleeve 66 toward the interior.

A nozzle tube 96 has an outer diameter just slightly smaller than the inner diameter of the sleeve 66 so that the nozzle tube 96 defines a sliding fit inside the sleeve. A leading end of the nozzle tube 96 has internal threads for mating with external threads 98 on a nozzle 100. Spaced slightly forward of the trailing end of the nozzle tube 96 is a stop flange 102 projecting radially from the outer surface of the nozzle-tube to abut the trailing end of the sleeve 66. The stop flange 102 is positioned on the nozzle tube 96 such that, when the stop flange abuts the trailing end of the sleeve 66, the nozzle 100 projects forwardly from the leading end of the sleeve. A nozzle tube nut 104 engages a trailing surface of the stop flange 102 and has threads 106 (FIG. 12) for engagement with the external threads 71 on the trailing end of the sleeve 66. By this arrangement, the nozzle tube nut 104 holds the nozzle tube 96 in a predetermined fixed position on the sleeve 66. At the trailing end of the nozzle tube 96, spaced slightly rearward of the stop flange 102 is a structure, such as a plurality of annular ridges 108, to connect the nozzle tube 96 to a line, such as a flexible tube, carrying condensate to be dispersed.

As can be appreciated from FIGS. 10 and 11, the sleeve 66 in the embodiment illustrated has four radially-projecting ribs 68. It is contemplated that arrangements using a different number of ribs 68 are also suitable with the present invention. As can be seen from FIGS. 12 and 13, the nozzle tube nut 104 has not only the internal threads 106 for engaging external threads at the trailing end of the sleeve 66 but also a flange 110 projecting radially inward in order to engage a rear surface on the stop flange 102 of the nozzle tube 96. As can be seen from FIGS. 14 and 15, the sleeve nut 94 has internal threads 112 and a plurality of recesses 114 formed in the radially outer and rear surfaces of the sleeve nut to make the sleeve nut well suited for gripping and tightening by hand and without the use of tools.

A plurality of toggle arms 116 are pivotally mounted at discrete locations spaced around the circumference of the support member 78 and are connected to the flange 70 for biasing the flange from a collapsed position to an expanded position. In the lower half of FIG. 8, the toggle arm 116 is shown in a collapsed position in the space 86 defined within the outer diameter generally defined by the ribs 68 of the sleeve 66. The nozzle tube 96 and the sleeve 66 are moved forward together relative to the outer tube 65 until the trailing edge 84 of the flange and trailing ends of the toggle arms 116 move outward beyond the leading end of the outer tube 65 and the exterior surface of the wall 64. At that point, the flange 70 and the toggle arms 116 are no longer constrained. As a result, they move outward by the action of coil springs 118 connected to the toggle arms 116, as well as by the inherent resiliency of the material of the flange 70. When the expanded state of the flange 70 is reached, the sleeve 66 and the flange 70 are drawn back toward the interior by the tightening of the sleeve nut 94 at the interior surface of the wall 64. The sleeve nut 94 is tightened until the trailing edge 84 of the flange 70 firmly contacts the exterior surface of the wall 64, thereby forming a seal with the wall, as is shown in the upper half of FIG. 8. Of course, in actual practice, all of the toggle arms 116 will be in the collapsed position at the same time and in the expanded position at the same time.

As can be appreciated from FIGS. 8 and 16, screws 120 secure a cover 122 over the cylindrical portion 74 of the flange 70 to the support 78 secured at the leading end of the sleeve 66. The cover 122 has a radially inwardly projecting flange 124 which engages a shoulder 126 defined on the nozzle 100.

As can be appreciated from FIGS. 17 and 18, each toggle arm 116 is a channel member, having a top 128 and two sides 130, the toggle arm tapering both in height and width from one end to the other. At the higher, wider end of the toggle arm 116, aligned openings 132 are formed in the sides 130. Each toggle arm 116 is mounted on the support member 78 and, more specifically, on a toggle arm mounting post 134 projecting radially from the support member, as can be seen from FIGS. 20 and 21. As can be seen from FIGS. 23 and 24, each mounting post 134 has oppositely projecting nubs 136. When the toggle arm 116 is positioned over the mounting post 134, the nubs 136 protrude through the aligned openings 132 in the sides 130 of the toggle arm 116 so that the toggle arm pivots on the mounting post. A coil spring 118 is positioned around at least one of the nubs 136, between the mounting post 134 and a side 130 of the toggle arm 116 to bias the toggle arm to a position in which the toggle arm projects at an angle from the sleeve 66. As can be appreciated from FIGS. 8 and 19, each coil spring 118 has a first leg 138 projecting along and contacting an undersurface of the top 128 of the toggle arm 116, and another leg 140 projecting from the coil of the spring and engaging a surface on the support 78. As can be seen from FIGS. 20 and 21, a plurality of the toggle arm support posts 134 project radially in a plane transverse to the axis of the cylinder of the support member 78 in a plane adjacent to the trailing end of the support member. Spaced slightly forward of this plane is a flange protector 142, which itself is a flange flaring outwardly and rearwardly from the cylindrical portion of the can support member 78. The flange protector 142 form an angle of, for example, 30° with a plane transverse to the longitudinal axis of the support member 78. The flange protector 142 prevents the material of the flange 70 from being caught between the relatively moving surfaces of the toggle arms 116 and their supporting posts 134. The top 128 of the channel defining each toggle arm 116 projects sufficiently beyond the aligned openings 132 in a direction toward the larger end of the toggle arm 116 so that the larger end of the toggle arm engages the support 78 to prevent the coil spring 118 from biasing the toggle arm beyond an acute angle with the support member 78. This arrangement prevents the frustoconical portion 72 of the flange 70 from inverting when the flange 70 is drawn against the exterior surface of the wall 64 by the sleeve nut 94.

As can be appreciated from FIGS. 24 and 26, the trailing edge 84 of the flange 70 is folded over toward the interior surface of the cone to form a hem 144. Thus, a thickened portion is formed in the frustoconical portion 72 of the flange 70 at the trailing edge 84. Furthermore, pockets 146 are formed in the hem 144 to accommodate trailing ends of the toggle arms 116, by which the flange 70 and the toggle arms move together.

It is preferred that the nozzle 100 be made of brass, that the flange 70 be made of neoprene, and that the support member 78, the toggle arms 116, the coil springs 118 and the screws 122 be made of cadmium-plated steel. The other parts of the sleeve assembly according to the present invention are preferably made of plastic.

It will be apparent that various changes and modifications can be made to the embodiments of the invention disclosed herein without departing from the spirit and scope of the invention, which are defined by the appended claims.

I claim:

1. A device for securing an item in an opening through a wall of a building having a relatively accessible interior surface and an opposite relatively inaccessible exterior surface, said device comprising:
   a) an elongate sleeve adapted to be inserted through said opening in said wall of said building from said accessible interior surface, said sleeve having an outer peripheral boundary and an axial passage extending entirely through the sleeve to receive said item from said accessible interior surface and to define opposite first and second open ends on the sleeve;
   b) a resilient, radially constrictible flange on said first open end of said sleeve, said flange having an expanded condition in which said flange radially extends beyond said outer peripheral boundary of sleeve to engage said inaccessible exterior surface at a location plural stories above ground level;
   c) a radially reduced dimension portion of said sleeve for accommodating said flange within said outer peripheral boundary of said sleeve, said flange having a radially constricted condition in which said flange is entirely within said outer peripheral boundary of said sleeve; and
   d) engagement means at said second open end of said sleeve for securing said sleeve to said wall of said building at said accessible interior surface without preventing said axial passage from receiving said item.

2. The device according to claim 1, wherein said flange is made of resilient, deformable material.

3. The device according to claim 2, wherein said flange comprises a membrane having a frustoconical shape.

4. The device according to claim 3, wherein said membrane has a first end of minimum diameter connected to said first open end of said sleeve and a second end of maximum diameter spaced from said one end of said sleeve.

5. The device according to claim 1, further comprising a sealing element on said flange.

6. The device according to claim 1, wherein said sleeve has a plurality of radially projecting axial ribs, said outer periphery of said sleeve being defined by said ribs.

7. The device according to claim 1, further comprising an outer tube, said sleeve being positioned within said outer tube.

8. The device according to claim 1, wherein said sleeve has external threads adjacent said first open end, and said flange is secured to a member having internal threads, said member being securable to said sleeve by engagement of said internal threads with said external threads.

9. The device according to claim 1, wherein said engagement means comprises external threads proximate said second open end and a nut having internal threads engageable with said external threads.

10. The device according to claim 1, further comprising a nozzle.

11. The device according to claim 10, wherein said nozzle comprises an elongate tubular member.

12. The device according to claim 10, wherein said nozzle is mounted on a nozzle tube having an outer diameter approximating the diameter of the axial passage through the sleeve.

13. A method for mounting an item at a remote surface of a wall of a building defining the remote surface and an opposite, adjacent surface comprising:
   a) boring a through opening in the wall of said building from the adjacent surface through the remote surface;
   b) inserting from the adjacent surface of the wall of said building to a point beyond the remote surface of the wall of said building a sleeve having a leading end, a trailing end, an axial passage extending entirely through the sleeve, and a resilient, radially constrictible flange having an expanded condition in which the flange extends radially beyond the periphery of the through opening, said inserting step comprising radially constricting the flange for passage through the through opening, and inserting the sleeve sufficiently so that said flange is positioned beyond the remote surface of the wall of said building to allow the flange to expand to its relaxed condition;
   c) securing the sleeve in the through opening at said trailing end and said adjacent surface; and
   d) securing the item in the sleeve.

14. The method of claim 13, further comprising forming a seal around the through opening at the remote surface by drawing the flange back against the remote surface, and holding the flange in the drawn-back position.

15. The method of claim 14, wherein the sleeve has threads adjacent to its trailing end, and the step of inserting comprises leaving some of the threads exposed at the adjacent surface of the wall, the step of securing the sleeve in the through opening comprising engaging the threads with a nut, and the steps of forming the seal and holding the flange in the drawn-back position comprising screwing the nut on the threads.

16. The method of claim 14, wherein said flange has a resilient compressible sealing element, and the step of forming a seal comprises compressing the sealing element against the remote surface of the wall.

17. The method of claim 13, wherein the sleeve has internal threads and the item has external threads, and the Step of securing the item in the sleeve comprises engaging the internal threads with the external threads.

18. A device for securing an item in an opening through a wall having a relatively accessible surface and an opposite relatively inaccessible surface, said device comprising:

a) an elongate sleeve adapted to be inserted through said opening from said accessible surface, said sleeve having an outer peripheral boundary and an axial passage extending entirely through the sleeve to receive said item from said accessible surface and to define opposite first and second open ends on the sleeve;

b) a resilient, radially constrictible flange on said first open end of said sleeve, said flange having an expanded condition in which said flange radially extends beyond said outer peripheral boundary of said sleeve to engage said inaccessible surface;

c) a radially reduced dimension portion of said sleeve for accommodating said flange within said outer peripheral boundary of said sleeve, said flange having a radially constricted condition in which said flange is entirely within said outer peripheral boundary of said sleeve;

d) engagement means at said the second open end of said sleeve for securing said sleeve to said wall at said accessible surface without preventing said axial passage from receiving said item;

e) a plurality of toggle arms disposed between said sleeve and said flange being pivotally connected to said sleeve and connected to said flange; and f) means for biasing said toggle arms from a position parallel to said sleeve to a position in which said toggle arms define an acute angle with said sleeve.

19. The device according to claim 18, further comprising means for preventing said toggle arms from pivoting beyond the position in which said toggle arms define said acute angle.

20. A method of mounting a nozzle at a remote surface of a wall defining the remote surface and an opposite adjacent surface for conveying condensate from an air conditioning system, comprising the steps of:

a) boring a through opening in the wall from the adjacent surface through the remote surface;

b) inserting from the adjacent surface of the wall to a point beyond the remote surface of the wall a sleeve having a leading end, a trailing end, an axial passage extending entirely through the sleeve, and a resilient, radially constrictible flange having an expanded condition in which the flange extends radially beyond the periphery of the through opening, said inserting step comprising radially constricting the flange for passage through the through opening, and inserting the sleeve sufficiently so that said flange is positioned beyond the remote surface of the wall to allow the flange to expand to its relaxed condition;

c) securing the sleeve in the through opening at said trailing end and said adjacent surface;

d) securing the nozzle in the sleeve;

e) connecting the nozzle at said remote surface to said air conditioning system; and f) conveying condensate from said air conditioning system through said nozzle.

21. The method of claim 20, wherein the sleeve has internal threads and the nozzle has external threads, and the step of securing the nozzle in the sleeve comprises engaging the internal threads with the external threads.

* * * * *